United States Patent [19]

Boots et al.

[11] Patent Number: 4,602,815
[45] Date of Patent: Jul. 29, 1986

[54] SLIDING ROOF FOR A VEHICLE

[75] Inventors: Robert T. Boots, Haarlem; Johannes N. Huyer, Zandvoort, both of Netherlands

[73] Assignee: Vermeulen-Hollandia Octrooien B.V., Netherlands

[21] Appl. No.: 557,471

[22] Filed: Dec. 2, 1983

[30] Foreign Application Priority Data

Dec. 30, 1982 [NL] Netherlands ............... 8205071

[51] Int. Cl.$^4$ ............................................. B60J 7/047
[52] U.S. Cl. ..................................... 296/222; 296/216
[58] Field of Search ......... 296/216, 217, 219, 220–223

[56] References Cited

U.S. PATENT DOCUMENTS

| 4,272,124 | 6/1981 | Schatzler et al. | 296/222 |
| 4,403,805 | 9/1983 | Strem, Jr. et al. | 296/221 |
| 4,407,541 | 10/1983 | Boots | 296/221 |
| 4,474,405 | 10/1984 | Kloppe et al. | 296/219 |

FOREIGN PATENT DOCUMENTS

| 3311478 | 10/1983 | Fed. Rep. of Germany | 296/222 |
| 2090565 | 7/1982 | United Kingdom | 296/222 |
| 2114212 | 8/1983 | United Kingdom | 296/222 |

Primary Examiner—David A. Scherbel
Assistant Examiner—Dennis H. Pedder
Attorney, Agent, or Firm—Kane, Dalsimer, Kane, Sullivan and Kurucz

[57] ABSTRACT

A sliding roof for a vehicle, having a fixed roof provided with an opening defined by a support frame, which movably supports a panel which in its front position closes the opening in the fixed roof. Upon actuation of a displacement member this movable panel, while lifting its rear side, may be moved partly outside the roof opening into positions above the fixed roof. On either side the movable panel is connected to the support frame exclusively by means of a plurality of pin-guide slot assemblies each consisting of a guide slot and a pin which may slide therein.

15 Claims, 7 Drawing Figures

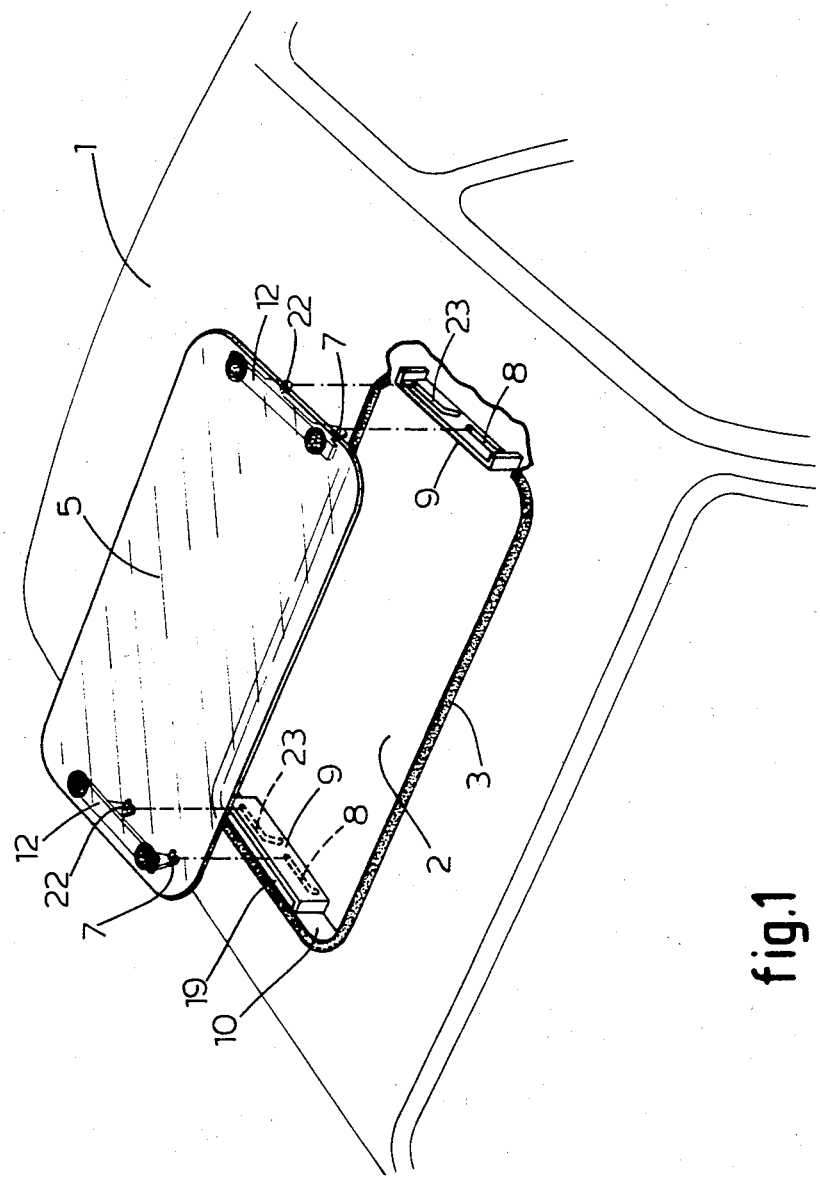

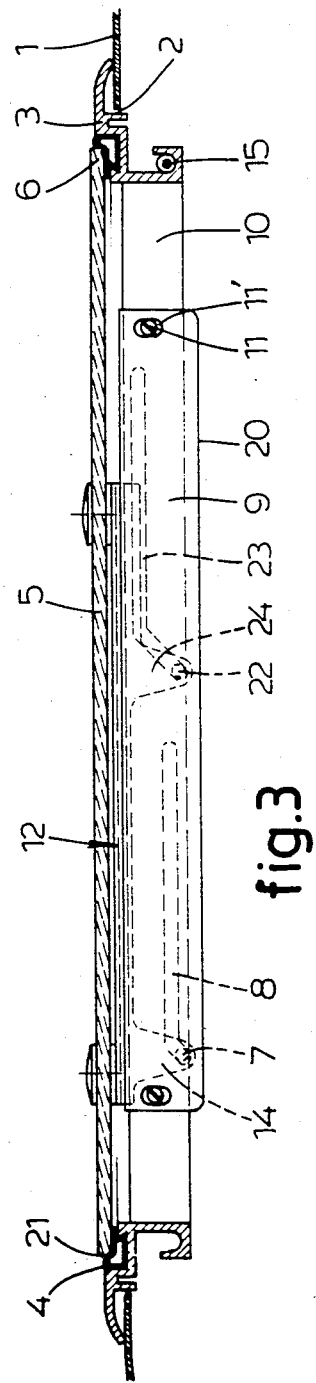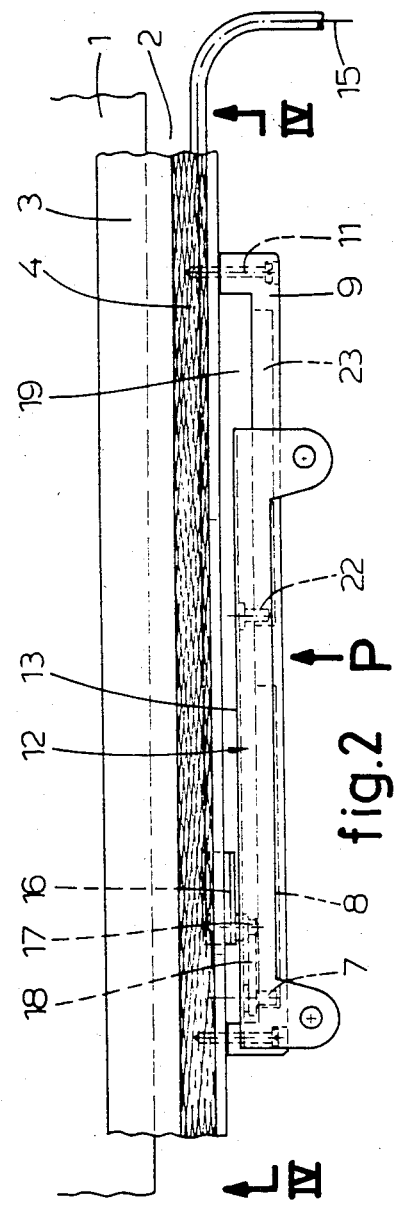

SLIDING ROOF FOR A VEHICLE

BACKGROUND OF THE INVENTION

The invention relates to a sliding roof for a vehicle, having a fixed roof provided with an opening defined by a support frame, which movably supports a panel which in its front position closes the opening in the fixed roof, whilst upon actuation of a displacement member this movable panel, while lifting its rear side, may be moved partly outside the roof opening into positions above the fixed roof.

In the known embodiments of sliding roofs of this type the connections between the movable panel and the support frame, which have to bring about the support and the guidance of the movable panel, are rather complicated and therefore expensive.

SUMMARY OF THE INVENTION

It is an object of the present invention to provide a sliding roof of the above type, wherein the support and guide construction for the movable panel is very simple and inexpensive.

For this purpose the sliding roof according to the invention is characterized in that on either side the movable panel is connected to the support frame exclusively by means of a plurality of pin-guide slot assemblies each consisting of a guide slot and a pin which may slide therein.

According to the invention the movable panel is exclusively supported and guided by the pins and the co-operating guide slots, which leads to an extremely simple construction.

Preferably on either side the movable panel carries two at least approximately horizontal transverse pins, which co-operate with the guide slots which are connected to the support frame.

According to a very important embodiment of the sliding roof according to the invention the front end portions of the guide slots are inclined upwardly and rearwardly and preferably enclose an angle of at least approximately 45° with the horizontal plane.

The front end portions of the guide slots may be connected to at least substantially horizontal rearward slot portions.

BRIEF DESCRIPTION OF THE DRAWINGS

The invention will hereafter be elucidated with reference to the drawing, which shows an embodiment of a sliding roof according to the invention for a vehicle.

FIG. 1 shows a schematic perspective view of a vehicle roof with a sliding roof according to this invention;

FIG. 2 is a top view of a portion of an embodiment of a sliding roof according to the invention in the closed position, wherein the panel has been removed in order to show the underlying parts.

FIG. 3 is a longitudinal section, partly in side view, of the sliding roof according to FIG. 2, viewed in the direction of the arrow P.

DESCRIPTION OF A PREFERRED EMBODIMENT

Figure 4:
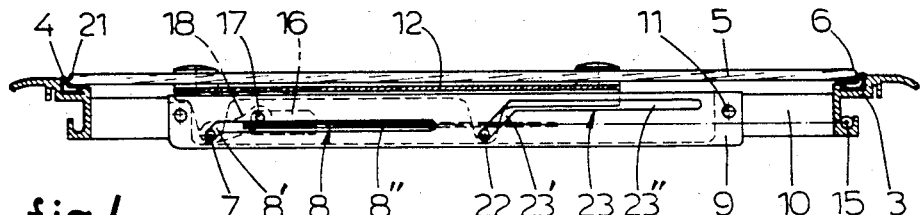
FIG. 4 is a longitudinal section along the plane III—III in FIG. 2 on a smaller scale.
Figure 5:
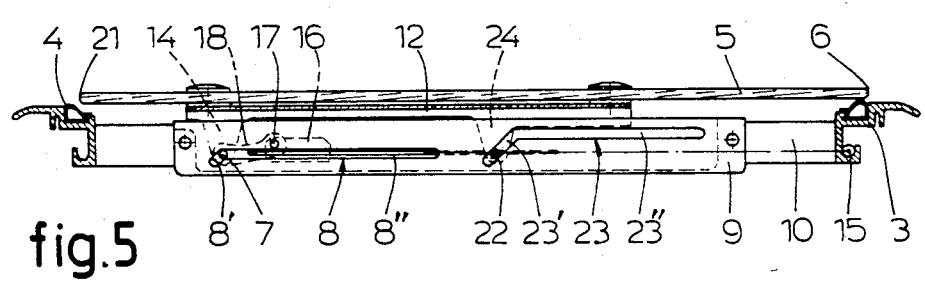
FIG. 5 is a longitudinal section corresponding with the section according to FIG. 4, wherein, however, opening of the sliding roof has just been started.
Figure 6:
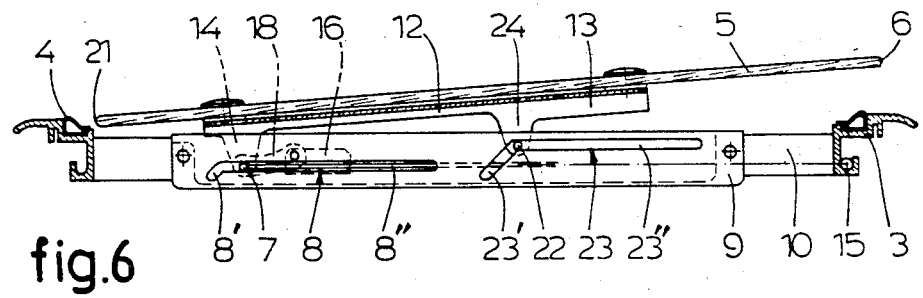
FIG. 6 is a longitudinal section corresponding with the sections according to FIGS. 4 and 5 in a subsequent position, wherein the movable panel extends in an inclined upward and rearward direction.

The drawing shows by way of example an embodiment of a sliding roof according to the invention for a vehicle. This vehicle comprises a fixed roof 1, in which an opening 2 is formed, which is defined by a support frame 3. This support frame 3 is provided with a circumferential sealing means 4.

A movable panel 5, which may be transparent and may be made from glass, is movably supported by the support frame 3 and in its front position closes the opening 2 in the fixed roof 1. Upon actuation of a displacement member this movable panel 5, while lifting its rear side 6, may be moved partly outside the roof opening 2 into positions above the fixed roof 1.

In order to guide the movable panel 5 with respect to the support frame 3, the movable panel carries on either side two horizontal transverse pins 7,22, which may each slide in guide slots 8,23.

These guide slots 8,23 are formed on either side in a guide strip 9, which may be made of artificial material and which is connected to a side wall 10 of the support frame 3.

The front end portions 8',23' of the guide slots 8 extends in an inclined upward and rearward direction at an angle of at least approximately 45° with the horizontal plane, while these front end portions 8',23' adjoin at least approximately horizontal rearward slot portions 8",23'.

As shown in FIGS. 3-7 the front end portions 23' of the rear guide slots 23 are considerably longer than the front end portions 8' of the front guide slots 8.

The guide strips 9 are connected to the inner surface of the side walls 10 of the support frame 3 by means of a plurality of elongated holes 11' formed in the guide strips 9 and co-operating bolts 11 connected to the relative side wall 10 of the support frame 3, which bolts 11 are passed through these elongated slots 11' and are provided with nuts. In this manner a vertical adjustment of the guide strips 9 with the guide slots 8,23 and also of the movable panel 5 may be easily obtained.

The guide slots 8,23 extend in the guide strips 9 from the outer surface inwardly to such extend that the slot bottoms lie at a distance from the inner surface of the guide strips 9, so that the guide slots 8,23 are invisible from the inner side.

Underneath the movable panel 5 a carrier 12 is connected on either side, which carrier extends in the longitudinal direction and comprises a downwardly directed flange 13 having a front lip 14 and a rear lip 24, which each carry one of the transverse pins 7,22. The transverse pines 7,22 are inwardly directed from the co-operating lip 14,24. Further each of th two front pins 7 is connected to a push-pull cable 15, which may be reciprocated by means of the displacement member.

Each push-pull cable 15 is connected with an actuating slide 16, which protrudes inwardly through a longitudinal slot in the co-operating side wall 10 of the support frame 3 and which carries a horizontal transverse shaft 17. A pivot strip 18, which may be made of artificial material is journalled on this transverse shaft 17 and hingedly engages the front pin 7. In this manner the actuating slide 16 may be displaced rectilinearly on either side through the longitudinal slot in the co-operating side wall 10 of the support frame 3, while the pin 7 coupled with the actuating slide 16 can pass the co-operating guide slot 8.

Each guide strip 9 is provided with an outer recess 19 in order to accommodate the flange 13 of the carrier 12 with the pins 7, the actuating slide 16 with the shaft 17 and the pivot strip 18. This recess is closed on the lower side by a cover 20, which makes the above elements invisible from below.

Figure 7:
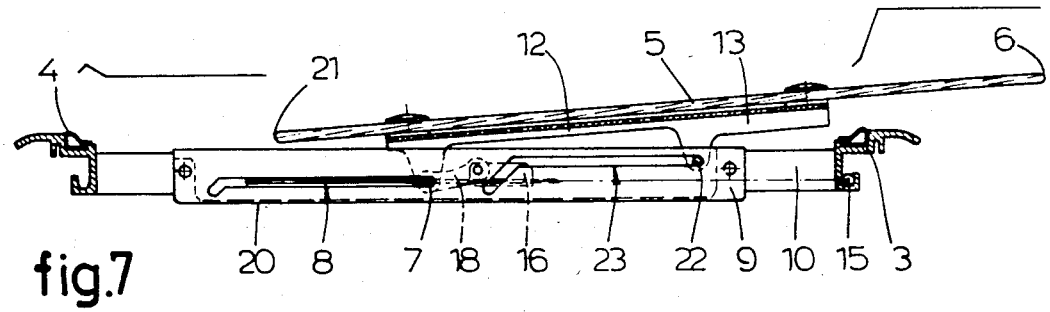
FIG. 7 is a longitudinal section corresponding with the sections according to FIGS. 4-6, wherein, however, the sliding roof has reached the entirely opened position, while in addition thereto the paths followed by the front side and the rear side of the movable panel are graphically represented.

As shown by the graphic representation in FIG. 7 of the paths which are followed by the front side 21 and the rear side 6 of the movable panel 5 during the opening and the closing movement, the guide slots 8,23 are shaped in such manner that during the opening movement of the movable panel 5 the front side 21 thereof first moves in an inclined upward and rearward direction, thereafter moves in an inclined downward and rearward direction and subsequently moves in an at least approximately horizontal rearward direction, whilst during the closing movement of the movable panel 5 the front side 21 thereof moves in the reverse sequence and in the opposite direction.

In the opened position the front side 21 of the movable panel 5 lies at a lower level than in the closed position, so that a downward wind is reduced to a minimum.

Further the guide slots 8,23 are shaped in such manner, that during the opening movement of the movable panel 5 the rear side thereof first moves in an inclined upward and rearward direction, thereafter moves in a more inclined upward and rearward direction, and subsequently moves in an at least approximately horizontal rearward direction. During the closing movement of the movable panel 5 the rear side 6 moves in the reverse sequence and in the opposite direction.

In the initial phase of the opening movement and in the end phase of the closing movement respectively, the front side 21 and the rear side 6 of the movable panel 5 are displaced in parallel planes, which enclose an angle of approximately 45° with the horizontal plane.

According to the invention a sliding roof for a vehicle is provided, which has an extremely simple construction due to the fact that supporting and guiding of the movable panel 5 by the support frame 3 exclusively take place by the co-operating pin-guide slot assemblies 7,22 and 8,23 respectively. The sliding roof may be mounted very quickly, the possibility of an adjustment of the height of the movable panel 5 by means of the elongated holes 11' in the guide strips 9 and the co-operating bolts 11 being of advantage in this respect.

As the movable panel 5 moves forward along an angle of at least approximately 45° during the closing movement and then engages the sealing means 4, an excellent seal is obtained, so that the application of water discharge hoses may be dispensed with.

The invention is not restricted to the embodiment shown in the drawing by way of example, which may be varied in several manners within the scope of the appended claims.

I claim:

1. A sliding roof for a vehicle with a front end and a rear end and a roof opening, comprising:
   a frame disposed around said opening, and having two lateral frame sides, each lateral frame side having a front and rear guide slot, each of said guide slots having respective front portions inclined upward in the rear direction and rear portions adjoining said front portions and extending substantially horizontally;
   a panel movably supported by said frame for closing said opening and having front and rear panel portions and two lateral panel portions, each of said lateral panel portions having front and rear traverse guide pins engaging said slots respectively;
   the guide slots being shaped in such manner that during an opening movement of the movable panel, the front panel portion first moves in an inclined upward rearwardly direction, thereafter moves in an inclined downward and rearwardly direction and subsequently moves in an at least approximately horizontal rearward direction, whilst during a closing movement of the movable panel the front panel portion is moved in the reverse sequence and in the opposite direction towards a closed position;
   whereby when said panel is moved rearwardly the rear panel portion lifts upwardly and partially overlaps said fixed roof.

2. A sliding roof as claimed in claim 1, wherein the front portions of the guide slots enclose an angle of at least approximately 45° with the horizontal plane.

3. A sliding roof as claimed in claim 2, wherein the front portions of the rear guide slots are considerably longer than the front portions of the front guide slots.

4. A sliding roof as claimed in claim 1, wherein the guide slots are shaped in such manner that in an opened position the front panel member lies at a lower level than in the closed position.

5. A sliding roof as claimed in claim 1, wherein the guide slots are shaped in such manner that during the opening movement the rear panel portion first moves in an inclined upward rearwardly direction, thereafter moves in a more inclined upward and rearwardly direction and subsequently moves in an at least approximately horizontal rearward direction, whilst during the closing movement, the rear panel portion moves in the reverse sequence and in the opposite direction.

6. A sliding roof as claimed in claim 5, wherein the guide slots are shaped in such manner that in the initial phase of the opening movement and in the end phase of the closing movement respectively the front and the rear panel portions panel are displaced in parallel planes.

7. A sliding roof as claimed in claim 6, wherein the said planes enclose an angle of at least approximately 45° with the horizontal plane.

8. A sliding roof as claimed in claim 7, wherein the guide slots are formed in a guide strip, which is connected to a side wall of the support frame.

9. A sliding roof as claimed in claim 8, wherein the guide strips are connected to the side walls of the support frame in an adjustable manner by means of elongated holes and co-operating bolts.

10. A sliding roof as claimed in claim 9, wherein the guide strips are made of artificial material.

11. A sliding roof as claimed in claim 10, wherein said guide slots have slot bottoms and the guide strips rest against an inner surface of the side walls of the support frame, while the guide slots extend in the guide strips from an outer surface inwardly to such extent, that the slot bottoms lie at a distance from the inner surface of the guide strips, while the pins are inwardly directed from co-operating lips carried by the movable panel.

12. A sliding roof as claimed in claim 5, wherein a carrier is connected underneath each lateral side of the movable panel, which carrier extends in the longitudinal direction and comprises a downwardly directed flange, which is provided with two lips, each of these lips carrying one of the pins.

13. A sliding roof as claimed in claim 12, wherein the two carriers are also connected with push-pull cables.

14. A sliding roof as claimed in claim 13, wherein each push-pull cable is connected with an actuating slide co-operating side wall of the support frame which carries a horizontal transverse shaft, while a pivot strip is journalled on this transverse shaft and hingedly engages one of the pins.

15. A sliding roof as claimed in claim 14, wherein each guide strip has an outer recess, which is closed on the lower side by a cover.

* * * * *